United States Patent
Vanhall et al.

(10) Patent No.: US 9,950,345 B2
(45) Date of Patent: Apr. 24, 2018

(54) SYSTEMS AND METHODS FOR SHEAR AND WARP DETECTION AND CORRECTION

(71) Applicant: LOCKHEED MARTIN CORPORATION, Bethesda, MD (US)

(72) Inventors: Richard C. Vanhall, Owego, NY (US); Adam L. Jung, Owego, NY (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 0 days.

(21) Appl. No.: 15/266,503

(22) Filed: Sep. 15, 2016

(65) Prior Publication Data

US 2018/0071787 A1    Mar. 15, 2018

(51) Int. Cl.
| | |
|---|---|
| *G06F 17/00* | (2006.01) |
| *B07C 3/20* | (2006.01) |
| *G06K 19/06* | (2006.01) |
| *G06K 7/14* | (2006.01) |

(52) U.S. Cl.
CPC .............. *B07C 3/20* (2013.01); *G06K 7/1413* (2013.01); *G06K 7/1443* (2013.01); *G06K 7/1447* (2013.01); *G06K 19/06028* (2013.01)

(58) Field of Classification Search
CPC .. B07C 3/14; B07C 3/18; G06Q 10/08; G07B 17/00661
USPC .................................................. 235/375, 494
See application file for complete search history.

(56) References Cited

U.S. PATENT DOCUMENTS

| | | | | |
|---|---|---|---|---|
| 5,420,403 A | * | 5/1995 | Allum ........................ | B07C 3/14 209/584 |
| 5,602,382 A | | 2/1997 | Ulvr et al. | |
| 5,912,448 A | * | 6/1999 | Sevier ................ | H04N 1/00681 235/454 |
| 6,188,801 B1 | * | 2/2001 | Tsai ......................... | G06K 9/03 382/289 |
| 6,674,919 B1 | * | 1/2004 | Ma ........................... | G06K 7/14 382/199 |
| 7,170,644 B2 | | 1/2007 | Loce et al. | |

(Continued)

FOREIGN PATENT DOCUMENTS

WO    2013016016 A2    1/2013

OTHER PUBLICATIONS

B Costin-Anton et al "High-Precision Orientation and Skew Detection for Texts in Scanned Documents" University of Bucharest, Computer Science Department, 2009, 4 pages.

(Continued)

*Primary Examiner* — Ahshik Kim
(74) *Attorney, Agent, or Firm* — Kent E. Kemeny; Andrew M. Calderon; Roberts Mlotkowski Safran Cole & Calderon, P.C.

(57) ABSTRACT

The present disclosure is directed to systems and methods for warp and shear detection and correction and, more particularly, to systems and methods for detecting and correcting shear and warp in an address block of a mailpiece. The method is implemented in a computing device and includes: locating a barcode which is spatially consistent with a block of text; obtaining barcode bar data from the barcode which correlates to a difference in spatial orientation of one or more bars of the barcode with respect to a best fit line through the barcode; and replacing the block of text with a non-distorted block of text which can be read by optical character recognition processes, based on the barcode bar data.

17 Claims, 8 Drawing Sheets

(56) References Cited

U.S. PATENT DOCUMENTS

| | | |
|---|---|---|
| 7,415,130 B1 | 8/2008 | Rundle et al. |
| 7,657,120 B2 | 2/2010 | Aradhye |
| 8,590,794 B2 | 11/2013 | Wang et al. |
| 8,688,579 B1 | 4/2014 | Ethington et al. |
| 8,698,032 B2 | 4/2014 | Takahashi |
| 9,298,964 B2 | 3/2016 | Li et al. |
| 2014/0294236 A1 | 10/2014 | Biller et al. |

OTHER PUBLICATIONS

Arwa Al-Khatatneh et al."A Review of Skew Detection Techniques for Document" 17th UKSIM-AMSS International Conference on Modelling and Simulation, 2015, 6 pages.

Oliveira et al.,"An Efficient Algorithm for Segmenting Warped Text-Lines in Document Images", IEEE Conference Publications, publication year 2013, 2 Pages.

Zhang et al.,"Correcting document image warping based on regression of curved text lines", IEEE Conference Publications, publication year 2003 vol. 1, 2 Pages.

Zhang et al.,"Straightening warped text lines using polynomial regression", IEEE Conference Publications, publication year 2002 vol. 3, 2 Pages.

Extended European Search Report dated Feb. 12, 2018 in related EP Application No. 17190558.1-1207, 8 pages.

\* cited by examiner

SYSTEMS AND METHODS FOR SHEAR AND WARP DETECTION AND CORRECTION

FIELD OF THE INVENTION

The invention is directed to systems and methods for warp and shear detection and correction and, more particularly, to systems and methods for detecting and correcting shear and warp of an address block of a mailpiece.

BACKGROUND DESCRIPTION

Imaging cameras in mail processing machines may capture a distorted image of an address block when the mailpiece is not oriented in an expected manner with the camera. Examples include soft packages, tubes, non-rectangular shapes, etc. This distorted image may cause subsequent optical character recognition (OCR) processes to degrade or fail, resulting in the mailpiece being rejected from the automated sorting system and, hence, requiring manual sorting processes.

By way of more specific explanation, imaging geometry problems due to unusually shaped or situated mailpieces with respect to the imaging camera will result in distorted images. Distorted images generally are not corrected in the image domain but, if possible, are dealt with by a robust OCR system. While this may work for small distortions, larger distortions will exceed the algorithms ability to deal with the problem and the OCR results will be unusable.

For example, in cases when the image is warped, OCR generally may fail by breaking what should be a single line of text into several lines and perhaps even incorrectly grouping small segments of text from different lines together. In cases when the image is sheared, OCR may have difficulty both in segmenting the characters due to the slanted posture and in recognizing the characters. In these cases, the mailpieces cannot be sorted with automated approaches and, instead, the mailpieces will need to be manually sorted resulting in increased costs.

SUMMARY OF THE INVENTION

In an aspect of the invention, a method implemented in a computing device, comprises: locating a barcode which is spatially consistent with a block of text; obtaining barcode bar data from the barcode which correlates to a difference in spatial orientation of one or more bars of the barcode with respect to a best fit line through the barcode; and replacing the block of text with a non-distorted block of text which can be read by optical character recognition processes, based on the barcode bar data.

In yet another aspect of the invention, a computer program product for identifying shear or warp of an address block comprises program code embodied in a computer-readable storage medium. The program code is readable/executable by a computing device to: obtain an address block using an imaging system; locate a barcode associated with the address block; provide a best fit line through the located barcode; determine barcode bar data comprising a difference in spatial orientation of one or more bars of the barcode with respect to the best fit line; and correct a spatial orientation of the address block or text within the address block using the barcode bar data.

In still yet another aspect of the invention, a system comprises a CPU, a computer readable memory and a computer readable storage medium. The system further comprises program instructions to: obtain an address block with accompanying textual information; isolate a barcode associated with accompanying textual information of the address block; obtain barcode bar data of the isolated barcode which correlates to a difference in spatial orientation between a best fit line through the isolated barcode and individual bars of the barcode; and adjust a spatial orientation of the address block using the barcode bar data of the isolated barcode so the address block can be read by an optical character recognition process. The program instructions are stored on the computer readable storage medium.

BRIEF DESCRIPTION OF THE DRAWINGS

The invention is described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF EMBODIMENTS OF THE INVENTION

The invention is directed to systems and methods for warp and shear detection and correction and, more particularly, to systems and methods for detecting and correcting shear and warp of an address block of a mailpiece. In more specific embodiments, the systems and methods detect and correct warp and shear in an image of an address block with spatially associated 2 or 4-state barcodes. For example, in embodiments, the systems and methods detect and correct warp and shear in an image of an address block by collecting and saving barcode information which can then be used to correct for the distortion of the entire address block. In this way, advantageously, in implementing the systems and methods provided herein the barcode data can be used to simplify the detection of shear and warp in an address block, compared to the conventional OCR approaches.

Figure 1A:
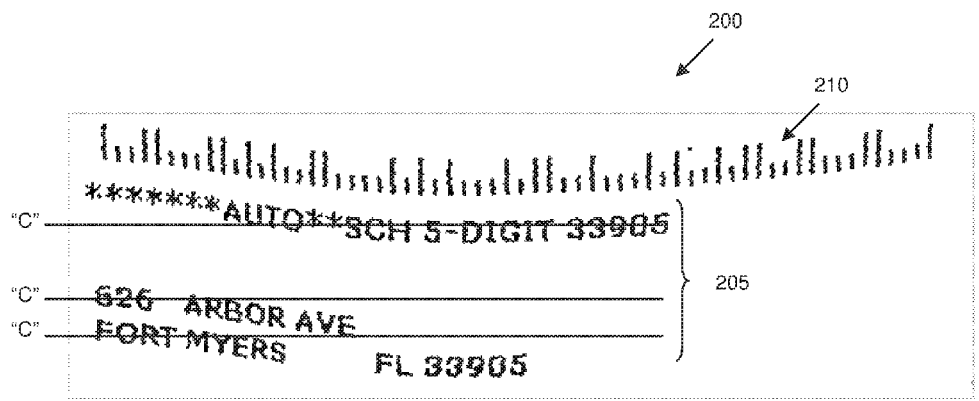
FIG. 1A shows a representative address block with a warped image.

FIG. 1A shows a representative address block with a warped image, e.g., distorted text which may not be properly read by an OCR process. In particular, as shown in FIG. 1A, the address block 200 (of a mailpiece) can include an image such as one or more text lines 205 and a barcode 210, e.g., 2 or 4 state barcode. As should be understood by those of skill in the art, each bar of a 4 state bar code contains a central "tracker" portion, and may contain an ascender portion, descender portion, neither, or both (e.g., a "full bar") as shown in FIG. 1C. As shown representatively in FIG. 1A, the one or more text lines 205 and barcode 210 are warped in the longitudinal direction. More specifically, the one or more text lines 205 and barcode 210 are offset from a horizontal centerline "C" of each respective row, along a longitudinal direction. The one or more text lines 205 and a barcode 210 can be detected by conventional imaging cameras and provided to the systems and methods of the present invention to correct for the warping as described herein. Once corrected, the address block can be further processed using conventional OCR processes.

Figure 1B:
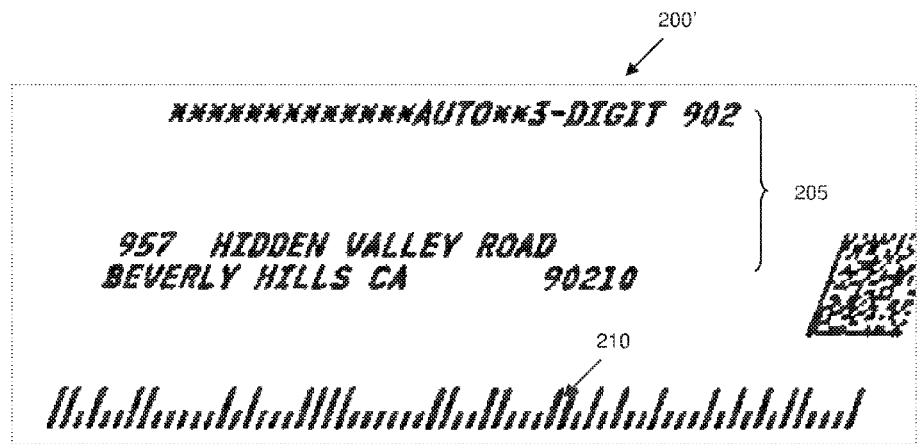
FIG. 1B shows a representative address block with a sheared image.
Figure 1C:
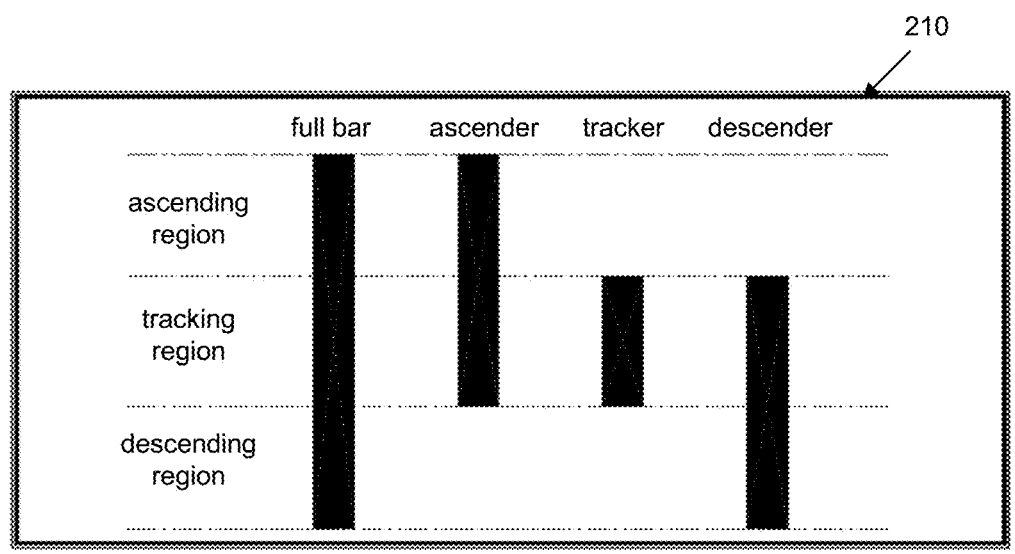
FIG. 1C shows a representative barcode which includes a central tracker portion, an ascender, descender, and full bar.

FIG. 1B shows a representative address block with a sheared image, e.g., distorted text which may not be properly read by an OCR process. In particular, as shown in FIG. 1B, the address block 200' of the mailpiece similarly includes an image such as one or more text lines 205 and a barcode 210. However, as shown in FIG. 1B, the one or more text lines 205 and barcode 210 are slanted (e.g., italicized) and sheared in the longitudinal direction. More specifically, the text and barcodes of the one or more text lines 205 and barcode 210, respectively, are slanted and each line is offset in a left to right direction (or vice versa) (e.g., as if they are written in italics and each line is slightly offset or slid along the longitudinal axis with respect to its adjacent line). As already noted herein, the one or more text lines 205 and a barcode 210 can be detected by conventional imaging cameras and provided to the systems and methods of the present invention to correct for the shearing. Once corrected, the address block can be further processed using conventional OCR processes.

System Environment

The present invention may be embodied as a system, method or computer program product. The present invention may take the form of a hardware embodiment, a software embodiment or a combination of software and hardware. Furthermore, the present invention may take the form of a computer program product embodied in any tangible storage having computer-readable program code embodied in computer-readable storage medium (non-transitory medium). The computer-readable storage medium can contain or store information for use by or in connection with the instruction execution system, apparatus, or device. The computer-readable storage medium may be, for example, an electronic, magnetic, optical, electromagnetic, infrared, or semiconductor system, apparatus, or device or other non-transitory medium, memory, device or system.

More specific examples of the computer-readable storage medium would include the following non-transitory systems, devices and/or memory: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, the computer readable storage medium, memory, system and/or device is not to be construed as being transitory signals per se. Hereinafter, the computer readable storage medium, memory, system and/or device is generally referred to as computer readable storage medium.

Figure 2:
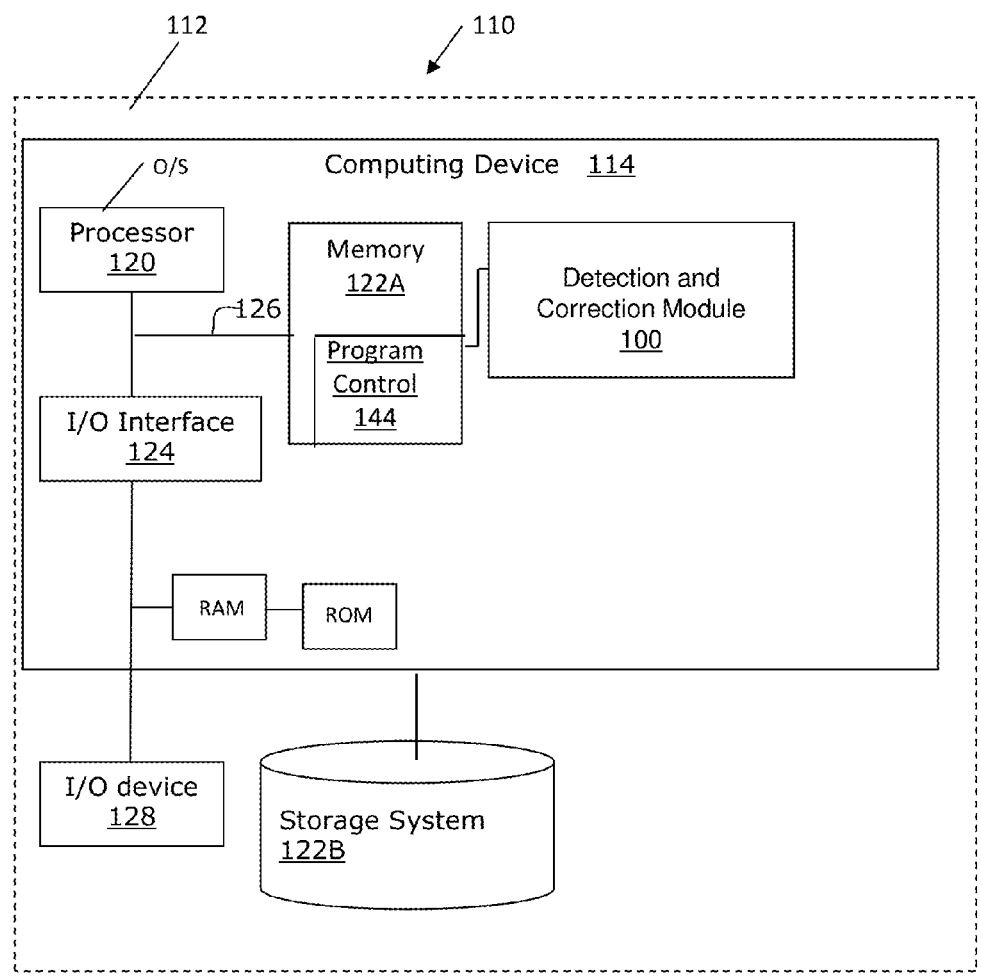
FIG. 2 shows an illustrative environment for implementing the steps in accordance with aspects of the invention.

FIG. 2 shows an illustrative environment 110 for managing the processes in accordance with the invention. The environment 110 includes a server or other computing system 112 that can perform the processes described herein. In embodiments, the illustrative environment may be used in a mail sorting and sequencing system as shown illustratively in FIG. 5 which may include OCR processes; although other sorting and sequencing systems are also contemplated by the present invention. The computing system 112 includes a computing device 114 which can be resident on or communicate with a network infrastructure or other computing devices.

The computing device 114 includes a processor 120, memory 122A, an I/O interface 124, and a bus 126. In addition, the computing device 114 includes random access memory (RAM), a read-only memory (ROM), and an operating system (O/S). The computing device 114 is in communication with an external I/O device/resource 128 and the storage system 122B. The I/O device 128 can comprise any device that enables an individual to interact with the computing device 114 (e.g., user interface) or any device that enables the computing device 114 to communicate with one or more other computing devices using any type of communications link or any device that enables the computing device 114 to interact with its environment. By way of example, the I/O device 128 can be a barcode scanning device or optical character recognition device or imaging camera, for reading/detecting address blocks having text and barcode information.

The processor 120 executes computer program code (e.g., program control 144), which can be stored in the memory 122A and/or storage system 122B. While executing the computer program code, the processor 120 can read and/or write data to/from memory 122A, storage system 122B, and/or I/O interface 124. The program code 144 executes the processes of the invention such as, for example, detecting and correcting warp and shear of images in an address block of a mailpiece. In this way, it is now possible to compensate and/or correct imaging geometry problems of the address block due to unusually shaped or situated mailpieces with respect to the imaging camera, without encountering the issues of conventional OCR processes, e.g., breaking what should be a single line of text into several lines, incorrectly grouping small segments of text from different lines together, segmenting the characters due to the slanted posture, etc. This will ensure that the mailpiece can be efficiently processed, without any confusion, using conventional OCR processes.

The computing device 114 includes a detection and correction module 100, which can be implemented as one or more program code in the program control 144 stored in memory 122A as a separate or combined module. Additionally, the detection and correction module 100 may be implemented as separate dedicated processors or a single or several processors to provide the functionality of this tool. Moreover, it should be understood by those of ordinary skill in the art that the detection and correction module 100 is used as a general descriptive term for providing the features and/or functions of the present invention, and that the detection and correction module 100 may comprise many different components such as, for example, the components and/or infrastructure described and shown with reference to FIG. 2.

In embodiments, the detection and correction module 100 is operative and/or configured to detect and correct warp and shear of images (e.g., distorted text blocks and/or barcodes) in an address block of a mailpiece. This is generally accomplished by using collected barcode data, with the following unique functionality:

(i) locating a barcode which is spatially consistent with a block of text;

(ii) determining a difference in spatial orientation of one or more bars of the barcode with respect to a best fit line through the barcode;

(iii) correcting the spatial orientation of the distorted images within the address block which may include creating a new address block (with non-distorted images which can be read by OCR processes); and (iv) replacing the original, distorted address block with non-distorted block of text with the new address block (e.g., which includes block of text which is acceptably oriented for subsequent OCR processing).

As should be understood, the new address block is created based on the barcode data, e.g., the difference of the spatial orientation of one or more bars with respect to the best fit line. That is, once barcode bar data which comprises or correlates to a difference in spatial orientation of one or more bars of the barcode with respect to the best fit line through the barcode, it is then possible to correct a spatial orientation of the address block or text within the address block using the barcode bar data.

In more specific embodiments, the detection and correction module 100 is operative and/or configured to: (i) isolate the location, positions and size of each individual bar of a barcode; (ii) determine and/or provide and/or locate the best fit line to the individual bars, e.g., tracker center point; (iii) for shear, determine an average angle of the bars, e.g., generally any bar which is not a tracker, with respect to the best fit line; and (v) for warp, determine for each bar, e.g., from a tracker center point, a vertical offset from the best fit line. Using this barcode bar data, warp and shear of the barcode can be determined which, in turn, is used to make the appropriate adjustments to the accompanying text within the address block. That is, as the warp and shear of the barcode should be similar to the accompanying text within the address block, the processes and systems can make corrections/adjustments to the address block using the barcode bar data, e.g., the estimated average angle (for shear) and offset (for warp) of the bars of the barcode. The corrected address block can then be further processed using conventional OCR processes.

Implementations

FIGS. 3A-3D and 4A-4D show several illustrative schematics representative of processing sequences in accordance with aspects of the invention. More specifically, FIGS. 3A-3D show several illustrative schematics representative of processing sequences for determining and correcting warping of an image in an address block; whereas, FIGS. 4A-4D show several illustrative schematics representative of processing sequences for determining and correcting shearing of an image in an address block.

Figure 3A:
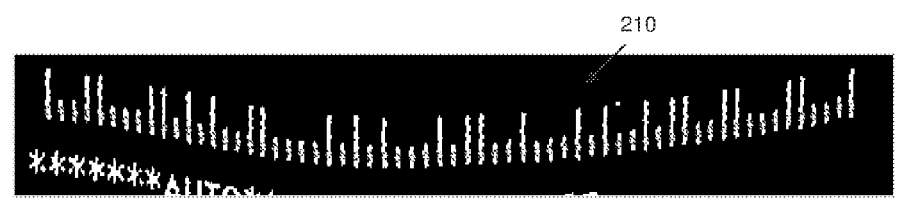
FIGS. 3A-3D show several illustrative schematics representative of processing sequences in accordance with aspects of the invention.
Figure 3B:
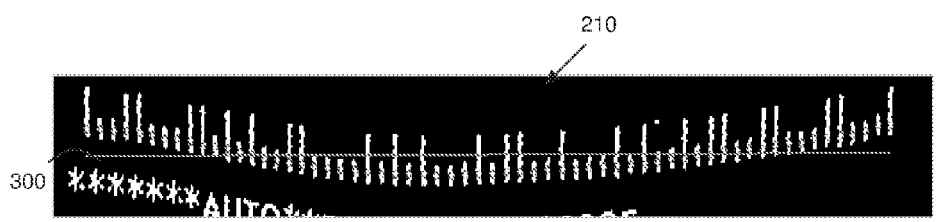
Figure 3C:
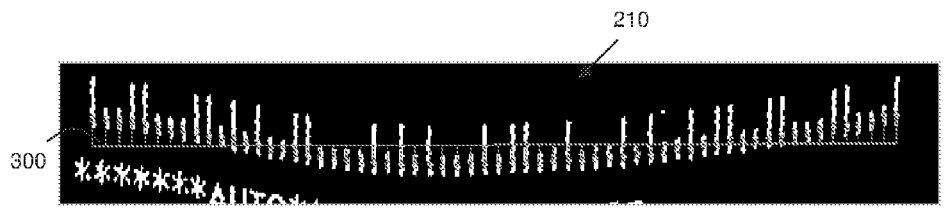
Figure 3D:
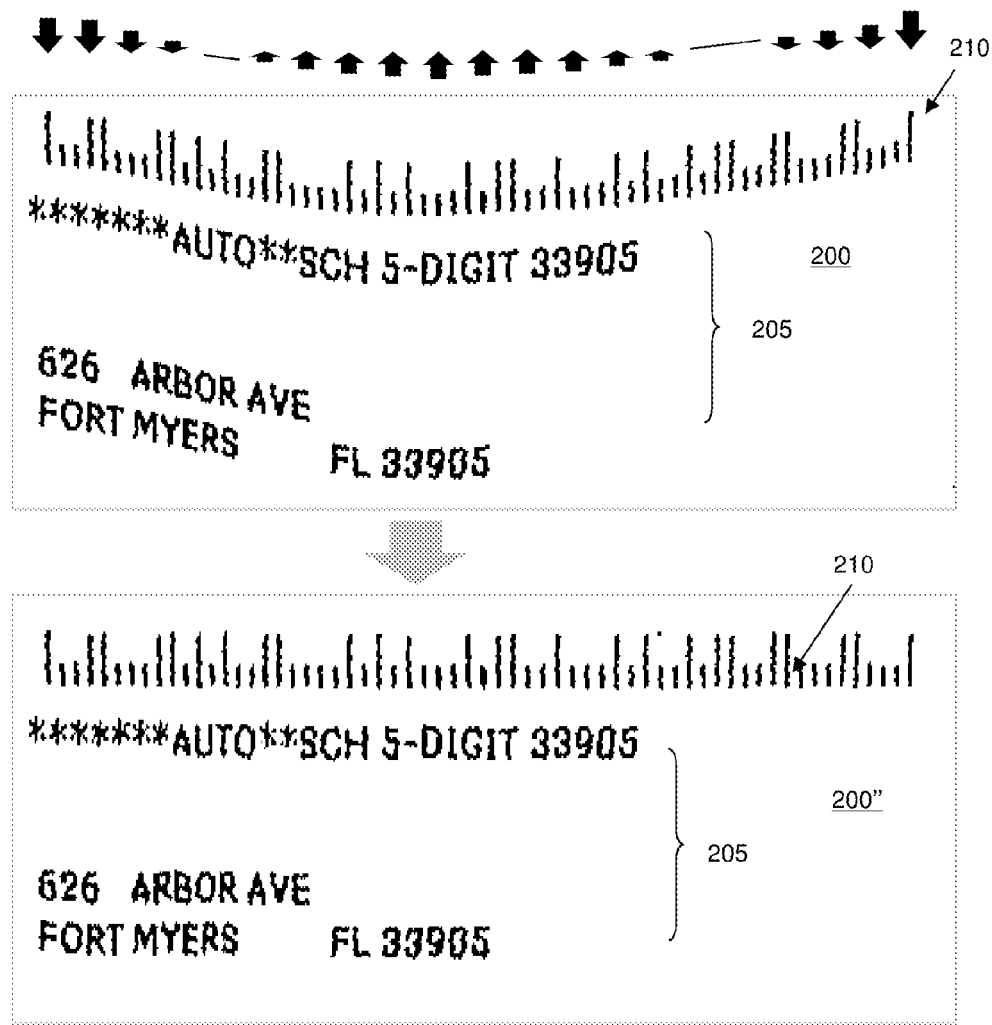
Figure 4A:
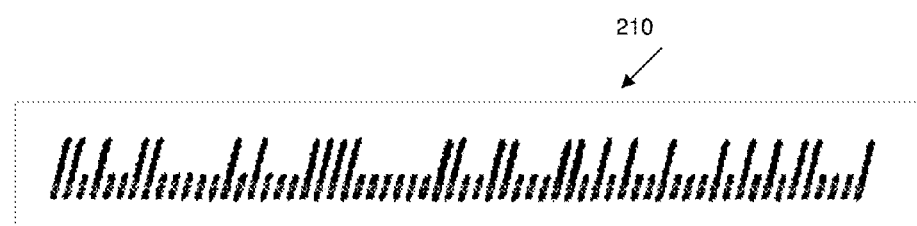
FIGS. 4A-4D show several illustrative schematics representative of processing sequences in accordance with additional aspects of the invention.
Figure 4B:
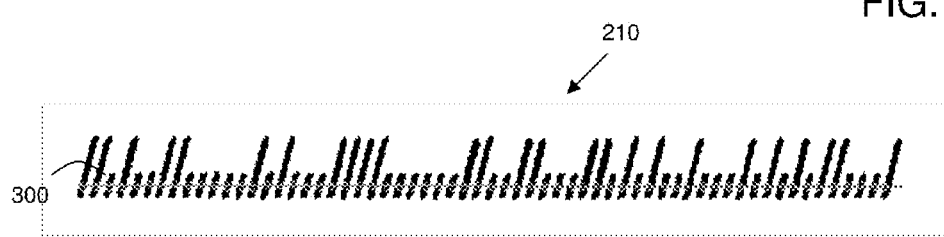
Figure 4C:
Figure 4D:
Figure 5:
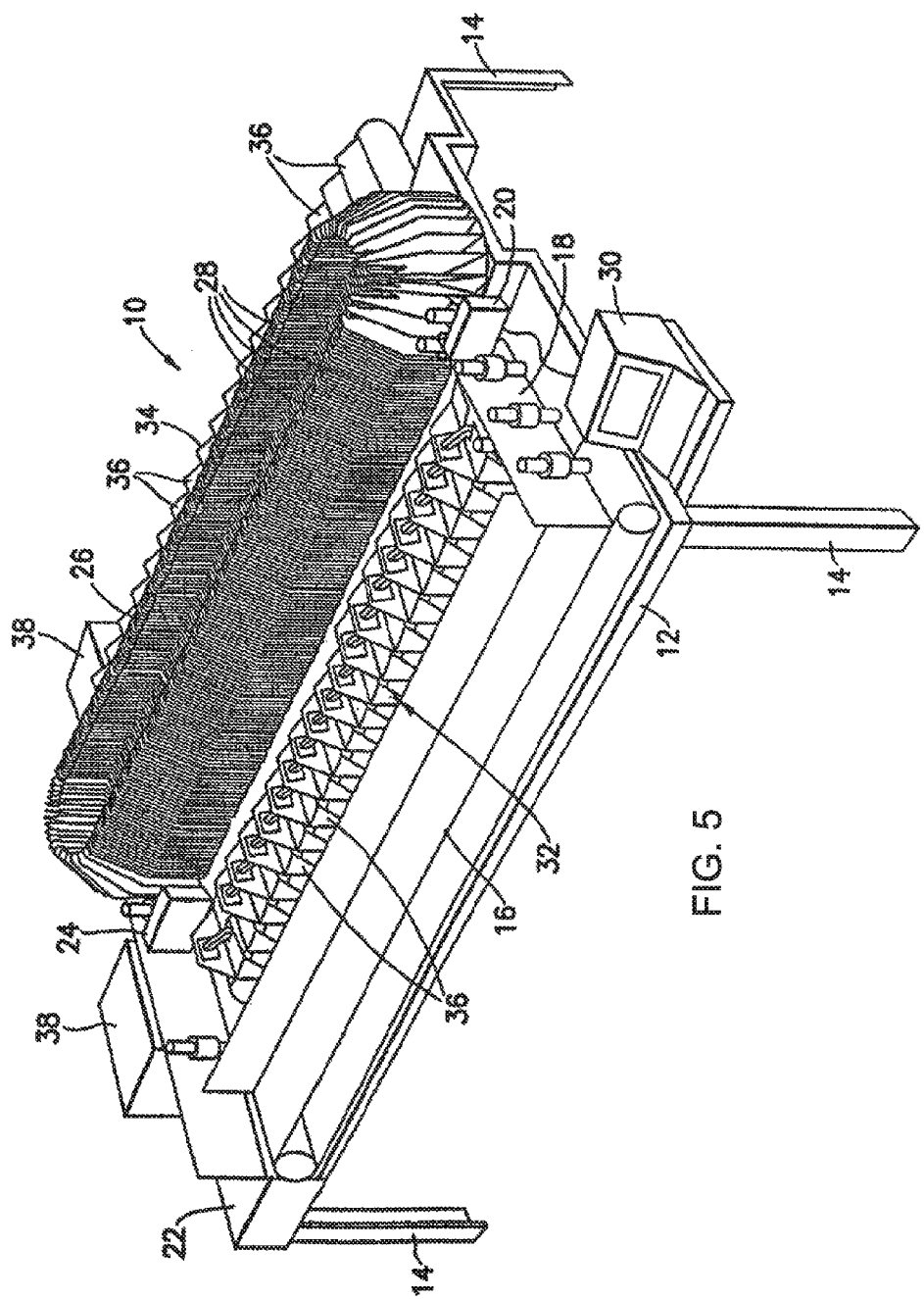
FIG. 5 shows an illustrative mail sorting and sequencing system, which can be used in implementing the processes sequences of the present invention.

The processing sequences shown in FIGS. 3A-3D and FIGS. 4A-4D can be implemented in the computing system shown in FIG. 2 and implemented within the illustrative mail sorting and sequencing system of FIG. 5. In embodiments, the several processing sequences in FIGS. 3A-3D and 4A-4D can be representative of an exemplary process flow implemented in a system, a method, and/or a computer program product and related functionality implemented in the computing system of FIG. 2. Accordingly, the processes associated with each processing sequence can be implemented by special purpose hardware-based systems that perform the specified functions or acts or carry out combinations of special purpose hardware and computer instructions.

As shown in FIG. 3A, the processing sequence (implementing the systems and methods described herein) will locate an address block by use of a conventional imaging camera. In embodiments and as described herein, the address block can include text and barcode information or only text information, as examples. Specifically, for each address block, the processing sequencing will locate the barcode 210 in the address block, which has a location that is spatially consistent with the address block. For example, the processing sequencing can locate the barcode 210 by different methods including, e.g., (i) locate any barcode that has its direction aligning with the direction of (distorted) text of the address block; (ii) locate any barcode that is visually close to the top or bottom of the text of the address block (e.g., within a predetermined amount of pixels from the top or bottom of the address block (e.g., 10 pixels); and/or (iii) locate any barcode that is visually horizontally overlapping with the text of the address block.

As shown in FIG. 3B, the processing will isolate the located barcode 210 and provide a best fit line 300 through the barcode 210. As should be understood, the best fit line 300 can be calculated using conventional methods known to those of skill in the art such that no further explanation is required herein for an understanding of the invention. In embodiments, the best fit line 300 is a straight line that best represents a central point along the longitudinal axis of the warped barcode. In embodiments, the best fit line 300 is placed relative to the same orientation of the barcode, e.g., maintaining a same angle of orientation along a horizontal or longitudinal line.

As shown in FIG. 3C, the processing sequence will examine the vertical offsets of the individual bars of the barcode 210 and determine if the address block should be de-warped. That is, the processing sequence will determine if there is a sufficient difference in spatial orientation between one or more bars of the barcode and the best fit line to warrant de-warping processes. More specifically, the processing sequence determines or finds an offset (distance) between the best fit line 300 and the tracker portion of each bar of the barcode, e.g., a distance that each tracker portion of each bar (whether the bar is a tracker, ascender, descender or full bar) is above or below (e.g., number of pixels) the best fit line. In more specific implementations, the processing sequence determines or finds the distance, e.g., number of pixels, between a central portion of each tracker portion of the bar and the best fit line 300. In even more specific implementations, the processing sequence determines or finds the distance, e.g., number of pixels, between a central portion of each tracker portion of the bar, whether it be a tracker bar, descender bar or ascender bar with relation to the best fit line 300. It should be recognized by those of skill in the art that other locations of the tracker bar, descender bar and/or ascender bar may be used for measuring the offset distance, e.g., top or bottom edges.

In FIG. 3D, if it is found that the distance is greater than a predetermined amount, e.g., greater than +/−5 pixels or greater, the processing sequence will extract the address block 200 and align it to horizontal in a sub-image. In embodiments, the extraction can be a physical or virtual (e.g., identify the location) extraction for correcting relative to such location. The processing sequence will then estimate the vertical offset of each column of the address block, e.g., text lines 205, using the barcode bar data obtained in FIG. 3C. That is, the estimate is based on the vertical offset of the barcode bar data, as described herein. The processing sequence will then vertically adjust or align the address block and its related information based on this estimate, e.g., using the barcode bar data, and replace the original address block 200 with the corrected address block 200" (e.g., with text provided in a spatial orientation that can be read by OCR processes).

It should be understood by those of skill in the art that the corrected address block 200" will include text that will be capable of being efficiently processed by conventional OCR processes. In other words, the corrected address block 200" will include text that will not be broken into several lines or incorrectly grouped into small segments of text from different lines together. In this way, the systems and methods detect and correct warp in an image of an address block for subsequent processing by the OCR using the barcode bar data.

Referring now to de-shearing processes shown in FIGS. 4A-4D, in FIG. 4A, the processing sequence (implementing the systems and methods described herein) will locate an address block by use of a conventional imaging camera. Specifically, for each address block, the processing sequencing will locate the barcode 210 in the address block, which has a location that is spatially consistent with the text of the address block. For example, the processing sequencing can locate the barcode 210 by different methods as already described above.

As shown in FIG. 4B, the processing sequence will isolate the located barcode 210 and provide a best fit line 300 through the isolated barcode 210. As already noted herein, the best fit line 300 is a straight line that best represents a central point along the longitudinal axis of the sheared barcode which can be calculated using conventional methods. In embodiments, the best fit line 300 is placed relative to the same orientation of the barcode, e.g., maintaining a same angle of orientation along a horizontal or longitudinal line. It should be understood and recognized by those of skill in the art that the processes shown in FIG. 4B can also be used concurrently or simultaneously with the processes shown in FIGS. 3A-3D for de-warping of the address block.

As shown in FIG. 4C, the processing sequence will examine the shear angle of the individual bars of the barcode 210, e.g., difference in spatial orientation of one or more bars of the barcode with respect to a best fit line, and determine if the address block should be de-sheared. More specifically, the processing sequence determines the average angle of each of the bars of the barcode 210 with respect to the best fit line 300. In more specific implementations, the processing sequence will determine an angle of each of the bars of the barcode 210, e.g., preferably any bar which is not a tracker bar, with respect to the best fit line 300, noting that the best fit line 300 is set at approximately 90 degrees (+/−up to about 5 degrees) with respect to the barcode 210. An average of the angle for each of the bars is then calculated by summing all of the angles and dividing the sum by the total number of angles obtained, e.g., in a conventional manner such that no further explanation is required herein for an understanding of the invention.

In FIG. 4D, if the average angle of the bars is greater than a predetermined amount from 90 degrees, e.g., greater than +/−2 degrees from the best fit line, the processing sequence will extract the address block 200 and align it to horizontal in a sub-image. In embodiments, the extraction can be a physical or virtual extraction for correcting relative to such location. The processing sequence can then determine the direction and amount of shear of each row of the address block, e.g., text lines 205, from the barcode bar data obtained in FIG. 4C. That is, the processing sequence will determine the angle of the slant and direction and amount of shear of each row of the address block, e.g., text lines 205, from the barcode bar data obtained in FIG. 4C. For example, the average angle can be used to determine a left to right offset (or vice versa) of each line in the address block by use of conventional trigonometry as should be understood by those of ordinary skill in the art. The slant of the text, on the other hand, can simply be the average angle of the barcode bar data obtained in FIG. 4C. In this way, the processing sequence will de-shear or slide each row of the address block and its related information the appropriate amount, e.g., based on the average angle from the barcode bar data, thus resulting in the corrected address block 200''' (e.g., with text provided in a spatial orientation that can be read by OCR processes).

It should be understood by those of skill in the art that the corrected address block 200''' will include text that will be capable of being efficiently processed by conventional OCR processes. In other words, with the corrected address block 200''', OCR processes will no longer have difficulty both in segmenting the characters due to the slanted posture and in recognizing the characters. In this way, the systems and methods detect and correct shear in an image of an address block for subsequent processing by OCR processes using the barcode bar data.

FIG. 5 shows an illustrative mail sorting and sequencing system, which can be used with the processes of the present invention. It should be understood by those of skill in the art that the present invention can be implemented with any number of mail sorting and sequencing systems, and that the illustrative representation of the mail sorting and sequencing system of FIG. 5 should not be considered a limiting feature to the claimed invention.

As shown in FIG. 5, the mail sorting and sequencing system is a single pass carrier delivery sequence sorter generally indicated by the numeral 10. The single pass carrier delivery sequence sorter 10 has a base 12 with four legs 14 (only three shown in FIG. 5) extending therefrom. An auto feed station 16 extends lengthwise along the base 12 and has a feeder 18 and an address reader 20 at one end and a manual feed station 22 with a second address reader 24 at the other end. The feeder 18 and address reader 20 create a feed, read and insert path to a racetrack sorting device 26 which has an array of bin dividers 28, adjacent ones of which create holders for individual mail pieces deposited therebetween. A video encoder/numerical controller 30 which may be a microprocessor or the like is located adjacent the feeder 18 and operationally connected to various components of the single pass carrier delivery sequence sorter 10 for coordinating the operation of the same in a manner explained. In embodiments, the address readers 20, 24 and/or video encoder/numerical controller 30 or other computing devices can read barcode information and implement the processes of the present invention. On either side of the racetrack sorting device 26 are two interim unloading station units generally indicated by the numeral 32, each having twenty (20) interim unloading stations 36. At the ends of the interim unloading station units 32, bundling/wrapping stations 38 are mounted on the base 12. See, e.g., U.S. Pat. No. 8,138,438, for a full detailed explanation of the single pass carrier delivery sequence sorter 10 and related systems, the contents of which are incorporated by reference in their entirety herein.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular means, materials and embodiments, the present invention is not intended to be limited to the particulars disclosed herein; rather, the present invention extends to all functionally equivalent structures, methods and uses, and combinations thereof such as are within the scope of the appended claims.

What is claimed is:

1. A method implemented in a computing device, comprising:
    locating a barcode which is spatially consistent with a block of text;
    locating an address block associated with the barcode and the block of text, which is distorted;
    obtaining barcode bar data from the barcode which correlates to a difference in spatial orientation of one or more bars of the barcode with respect to a best fit line through the barcode; and
    replacing the block of text with a non-distorted block of text which can be read by optical character recognition processes, based on the barcode bar data,
    wherein the locating the barcode comprises at least one of:
        locating any barcode that has its direction aligning with a direction of the distorted block of text associated with the address block;
        locating any barcode that is visually close to a top or bottom of the address block; or
        locating ally barcode that is visually horizontally overlapping with the address block.

2. The method of claim 1, further comprising isolating the barcode and providing the best fit line through the isolated barcode.

3. The method of claim 1, wherein the text block is an address block of a mailpiece.

4. The method of claim 1, wherein the barcode and the block of text are distorted.

5. The method of claim 4, wherein the distorted barcode and the distorted block of text are sheared or warped.

6. A method implemented in a computing device, comprising:
    locating a barcode which is spatially consistent with a block of text;
    locating an address block associated with the barcode and the block of text, which is distorted;
    obtaining barcode bar data from the barcode which correlates to a difference in spatial orientation of one or more bars of the barcode with respect to a best fit line through the barcode;
    isolating the barcode and providing the best fit line through the isolated barcode; and
    replacing the block of text with a non-distorted block of text which can be read by optical character recognition processes, based on the barcode bar data,
    wherein the difference in spatial orientation comprises finding a vertical offset between the best fit line and a predetermined portion of the one or more bars within the barcode, or finding an average angle between the best fit line and a predetermined portion of the one or more bars within the barcode.

7. The method of claim 6, wherein the vertical offset is between the best fit line and a center point of each tracker portion of each bar of the barcode.

8. The method of claim 6, further comprising:
    extracting, physically or virtually, the address block and aligning it to horizontal in a sub-image;
    estimating a vertical offset of each column of distorted text associated with the address block using the barcode bar data;
    adjusting the address block using the estimate vertical offset to create a corrected address block with the non-distorted block of text which is in a different spatial orientation than the block of text in the address block; and
    replacing the address block with the corrected address block.

9. The method of claim 6, wherein the average angle between the best fit line and a predetermined portion of the one or more bars within the barcode exceeds a predetermined amount from 90 degrees.

10. The method of claim 5, further comprising:
    extracting, physically or virtually, the address block and aligning it to horizontal in a sub-image;
    determining a direction and amount of shear of the extracted address block using the barcode bar data;
    adjusting the address block using the direction and amount of shear of the extracted address block to create a corrected address block with the non-distorted block of text which is in a different spatial orientation than the block of text in the address block; and
    replacing the address block with the corrected address block.

11. A computer program product for identifying shear and or warp of an address block, the computer program product comprising program code embodied in a computer-readable storage medium, the program code is readable/executable by a computing device to:
    obtain an address block using an imaging system;
    locate a barcode associated with the address block;
    provide a best fit line through the located barcode;
    determine barcode bar data comprising a difference in spatial orientation of one or more bars of the barcode with respect to the best fit line; and
    correct a spatial orientation of the address block or text within the address block using the barcode bar data,
    wherein the difference in spatial orientation comprises finding a vertical offset between the best fit line and a point of each tracker portion of bars of the barcode or an average angle between the best fit line and the one or more bars within the barcode.

12. The computer program product of claim 11, further comprising:
    extracting, physically or virtually, the address block and aligning it to horizontal in a sub-image;
    estimating the vertical offset of each column of text associated with the address block using the barcode bar data;
    adjusting the address block using the estimate vertical offset to create a corrected address block with block of text in a different spatial orientation than the block of text in the address block; and
    replacing the address block with the corrected address block.

13. The computer program product of claim 11, further comprising:
    extracting, physically or virtually, the address block and aligning it to horizontal in a sub-image;
    determining a direction and amount of shear of the extracted address block using the barcode bar data;
    adjusting the address block using the direction and amount of shear of the extracted address block to create a corrected address block with block of text in a different spatial orientation than the block of text in the address block; and replacing the address block with the corrected address block.

14. A computer program product for identifying shear and or warp of an address block, the computer program product comprising program code embodied in a computer-readable storage medium, the program code is readable/executable by a computing device to:

obtain an address block using an imaging system;
locate a barcode associated with the address block;
provide a best fit line through the located barcode;
determine barcode bar data comprising a difference in spatial orientation of one or more bars of the barcode with respect to the best fit line; and
correct a spatial orientation of the address block or text within the address block using the barcode bar data,
wherein the locating the barcode comprises at least one of:
 locating any barcode that has its direction aligning with a direction of a distorted block of text associated with the address block;
 locating any barcode that is visually close to a top or bottom of the address block; and
 locating any barcode that is visually horizontally overlapping with the address block.

15. A system comprising:
a CPU, a computer readable memory and a computer readable storage medium;
program instructions to obtain an address block with accompanying textual information;
program instructions to isolate a barcode associated with accompanying textual information of the address block;
program instructions to obtain barcode bar data of the isolated barcode which correlates to a difference in spatial orientation between a best fit line through the isolated barcode and individual bars of the barcode; and
program instructions to adjust a spatial orientation of the address block using the barcode bar data of the isolated barcode so the address block can be read by an optical character recognition process,
wherein the program instructions are stored on the computer readable storage medium, and
wherein the difference in spatial orientation comprises finding a vertical offset between the best fit line and a point of each tracker portion of bars of the barcode or an average angle between the best fit line and the one or more bars within the barcode.

16. The system of claim 15, further comprising:
program instructions to extract, physically or virtually, the address block and aligning it to horizontal in a sub-image;
program instructions to estimate the vertical offset of each column of text associated with the address block using the barcode bar data;
program instructions to adjust the address block using the estimate vertical offset to create a corrected address block with block of text in a different spatial orientation than the block of text in the address block; and
program instructions to replace the address block with the corrected address block.

17. The system of claim 15, further comprising:
program instructions to extract, physically or virtually, the address block and aligning it to horizontal in a sub-image;
program instructions to determine a direction and amount of shear of the extracted address block using the barcode bar data;
program instructions to adjust the address block using the direction and amount of shear of the extracted address block to create a corrected address block with block of text in a different spatial orientation than the block of text in the address block; and
program instructions to replace the address block with the corrected address block.

* * * * *